(12) United States Patent
Kolbert-Hyle et al.

(10) Patent No.: US 12,238,153 B2
(45) Date of Patent: *Feb. 25, 2025

(54) CLOUD-BASED VIDEO BROADCAST SYSTEM

(71) Applicant: Brandlive Inc., Portland, OR (US)

(72) Inventors: Sam Kolbert-Hyle, Portland, OR (US);
Thomas Iwasaki, Portland, OR (US);
Eli Ackerman, Portland, OR (US);
Scott Harrah, Scappoose, OR (US);
Adam Denny, Vancouver, WA (US)

(73) Assignee: Brandlive Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,870

(22) Filed: Sep. 27, 2022

(65) Prior Publication Data

US 2023/0025802 A1 Jan. 26, 2023

Related U.S. Application Data

(63) Continuation of application No. 17/544,735, filed on Dec. 7, 2021, now Pat. No. 11,457,049.

(60) Provisional application No. 63/224,807, filed on Jul. 22, 2021, provisional application No. 63/122,272, filed on Dec. 7, 2020.

(51) Int. Cl.
*H04L 65/403* (2022.01)
*H04L 67/02* (2022.01)
*H04L 67/10* (2022.01)

(52) U.S. Cl.
CPC ............ *H04L 65/403* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,108,613 B2* | 10/2018 | Spataro | G06F 16/93 |
| 11,457,049 B2* | 9/2022 | Kolbert-Hyle | H04L 65/611 |
| 2007/0058925 A1* | 3/2007 | Chiu | H04N 21/4758 386/262 |
| 2012/0113264 A1* | 5/2012 | Moshrefi | H04H 60/65 348/E7.086 |

* cited by examiner

*Primary Examiner* — Hemant S Patel
(74) *Attorney, Agent, or Firm* — Kolitch Romano Dascenzo Gates LLC

(57) ABSTRACT

A computer implemented method for video broadcasting includes receiving, via a graphical user interface (GUI), first information relating to a first shot including one or more first digital media resources and second information relating to a second shot including one or more second digital media resources. A first video feed in accordance with the first information is played on a digital canvas. A second video feed in accordance with the second information is loaded on the digital canvas, such that the second video feed is hidden by the first video feed. A broadcast is generated by capturing a series of video frames of the digital canvas, and the broadcast is transmitted to one or more first remote devices.

20 Claims, 11 Drawing Sheets

CLOUD-BASED VIDEO BROADCAST SYSTEM

CROSS-REFERENCES

The following applications and materials are incorporated herein, in their entireties, for all purposes: U.S. Provisional Patent Application Ser. No. 63/122,272, filed Dec. 7, 2020; U.S. Provisional Patent Application Ser. No. 63/224,807, filed Jul. 22, 2021; and U.S. patent application Ser. No. 17/544,735, filed Dec. 7, 2021.

FIELD

This disclosure relates to systems and methods for video broadcast. More specifically, the disclosed embodiments relate to cloud-based systems for video broadcast.

INTRODUCTION

As online video streaming becomes more ubiquitous, people from all around the world are collaborating and participating together in video broadcasts, presentations, and other online video applications. In some instances, a presenter and a producer may need to collaborate virtually, often requiring a complex and resource-heavy production tool. A scalable and collaborative video broadcast system accessible to anyone with internet access would help bring enterprise-level production tools to a wider audience.

SUMMARY

The present disclosure provides systems, apparatuses, and methods relating to video broadcast systems. In some embodiments, a computer implemented method for video broadcasting may include receiving, via a graphical user interface (GUI), first information relating to a first shot including one or more first digital media resources and second information relating to a second shot including one or more second digital media resources; playing a first video feed in accordance with the first information on a digital canvas; loading a second video feed in accordance with the second information on the digital canvas, such that the second video feed is hidden by the first video feed; generating a broadcast by capturing a series of video frames of the digital canvas; and transmitting the broadcast to one or more first remote devices.

In some embodiments, a data processing system for video processing may include one or more processors; a memory; and a plurality of instructions stored in the memory and executable by the one or more processors to: receive, via a graphical user interface (GUI), first information relating to a first shot including one or more first digital media resources and second information relating to a second shot including one or more second digital media resources; play a first video feed in accordance with the first information on a digital canvas; load a second video feed in accordance with the second information on the digital canvas, such that the second video feed is hidden by the first video feed; capture a series of video frames of the digital canvas to generate a broadcast; and transmit the broadcast to one or more first remote devices.

Features, functions, and advantages may be achieved independently in various embodiments of the present disclosure, or may be combined in yet other embodiments, further details of which can be seen with reference to the following description and drawings.

DETAILED DESCRIPTION

Figure 1:
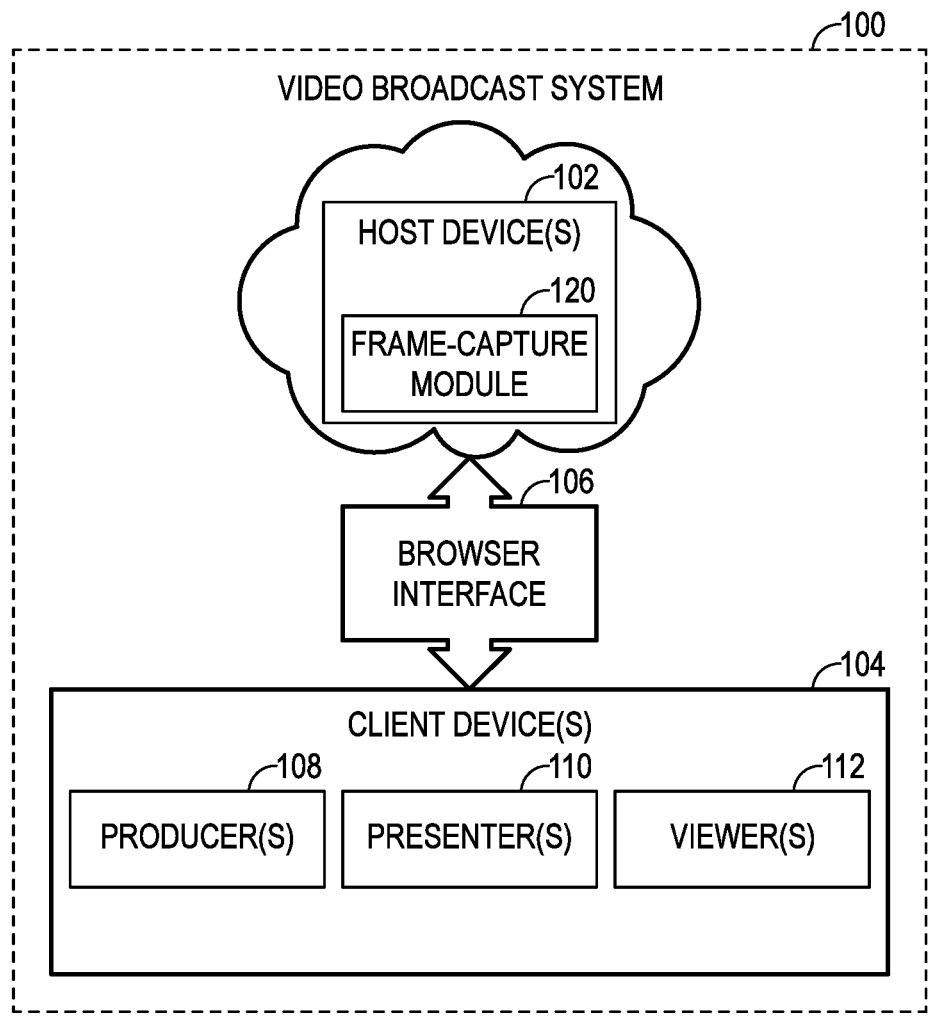
FIG. 1 is a schematic diagram of an illustrative cloud-based video broadcast system in accordance with aspects of the present disclosure.

Various aspects and examples of a cloud-based video broadcast system are described below and illustrated in the associated drawings. Unless otherwise specified, a video broadcast system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a cloud-based video broadcast system may include a cloud-based host device in network communication with client devices via a browser interface. The client devices include a producer client for a producer of the broadcast, a presenter client for a presenter of the broadcast, and a viewer client for a viewer of the broadcast, each client executable in a browser on each respective party's digital device.

The host device is responsible for hosting all of the broadcast media, encoding the output video and audio of the broadcast for playback, and facilitating communication between the client devices. The producer client enables the producer to arrange the broadcast media both spatially and temporally and signal to the host device when to begin the live broadcast. The presenter client enables the presenter to send their audio, video, and other media to the producer for further composition. The viewer client enables a decoding of the broadcast such that the broadcast is viewable by the viewer(s).

Technical solutions are disclosed herein for video broadcasting. Specifically, the disclosed system/method addresses a technical problem tied to computer technology and arising in the realm of broadcast systems and processes, namely the technical problem of providing remote collaboration between video producers and video presenters. The system and method disclosed herein provides an improved solution to this technical problem by utilizing a cloud-based collaboration and broadcast creation tool.

The disclosed systems and methods provide an integrated practical application of the principles discussed herein. Specifically, the disclosed systems and methods describes a specific manner of collaboration and broadcast creation, which provides a specific improvement over prior systems and results in an improved video broadcast system. Accordingly, the disclosed systems and methods apply the relevant principles in a meaningfully limited way.

Aspects of video broadcast systems may be embodied as a computer method, computer system, or computer program product. Accordingly, aspects of the video broadcast system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the video broadcast system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of video broadcast system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the video broadcast system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the video broadcast system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative video broadcast systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Cloud-Based Video Broadcast System

As shown in FIG. 1, this section describes an illustrative cloud-based video broadcast system 100, an example of the video broadcast system described above.

Video broadcast system 100 comprises a cloud system including one or more host devices 102 configured to electronically communicate with one or more client devices 104. Host device 102 provides audio and video streaming, e.g., utilizing real-time communication (RTC) protocols such as the real-time messaging protocol (RTMP), RTC direct, HTTP live streaming (HLS), and/or RTMP variants, as well as data storage, text communication, and other services to and/or between client devices 104.

Client devices 104 interact with the services that are hosted and/or provided by host device 102, for example through the use of a browser interface 106. Browser interface 106 may be accessible on client devices 104 through any suitable network application configured to communicate electronically with host device 102, such as a web browser. Client devices 104 include at least one producer client 108, at least one presenter client 110, and at least one viewer client 112. In some examples, client devices 104 may communicate directly between each other, such as a peer-to-peer system (e.g., without a singular, universal host device). In such examples, each respective client device may function as their own personal host device 102.

Producer client 108 is utilized by a producer of the video broadcast to both spatially and temporally arrange media (e.g., video and/or audio) in the broadcast, communicate with one or more presenters, and perform other, production-level, management functions as described further below. Presenter client 110 is utilized by the presenter to send video and audio, communicate with the producer, and perform other presentation-specific functions as described further below. Viewer client 110 is utilized by viewers to view (e.g., stream) the broadcast (e.g., in real-time, near real-time, or at another time) as well as perform other viewer-specific functions as described further below.

Host device 102 may perform an internet check on client devices 104 before the broadcast to ensure the download speed and upload speed of each client device is sufficient for broadcast, viewing, or production. The internet check may include measuring or estimating the download speed and upload speed, for example by measuring the time it takes for each client device to reply to a request from host device 102. In some examples, the internet check may be performed solely for producer client 108, presenter client 110, viewer client 112, or any combination thereof.

In some examples, all broadcast media (e.g., video, audio, graphical slides, splash screens, etc.) may be stored in electronic storage on host device 102. In some examples, all broadcast media may be stored in electronic storage on one or more client devices 104. In some examples, portions of the broadcast media are stored on host device 102 and client devices 104.

In some examples, the broadcast media is created through host applications executed on digital processors of host device 102, client devices 104, and/or both. The broadcast media is rendered into a video output in accordance with composition constraints provided by the producer through producer client 108. The video output is then transcoded by the host device and delivered to an RTMP destination and/or video player of the viewer client via browser interface 106. This configuration enables client devices 104 to be entirely browser-based (i.e., no client-side executables are required).

Browser interface 106 utilizes one or more application programming interfaces (API(s)) and a communication protocol (e.g., WebSocket) to facilitate communication between client devices 104 and host device 102 and, in some examples, communication between different client devices. The API(s) and communication protocol enables login, logout, and other interactive functions of each client-specific application described further below. The API(s) and communication protocol additionally manage the RTC video feeds, e.g., while rendering the output video.

Browser interface 106 may establish encrypted links between host device 102 and client devices 106, for example, through the use of an encryption protocol such as secure sockets layer (SSL), transport layer security (TLS), or another suitable protocol. In some examples, video broadcast system 100 ensures private broadcasting by requiring each viewer client to provide an encryption key as designated by the producer and/or presenter. In some examples, video broadcast system 100 enables public broadcasting such that any viewer client can access the broadcast without a key.

Producer client 108 controls the arrangement of broadcast media, herein referred to as a "shot." For example, a shot may include a video layout, presenter count and camera arrangement, graphical displays (e.g., splash screens), etc. The producer of the broadcast utilizes the producer client to compose shots in real-time, i.e., while the video is broadcast to the viewers. This arrangement enables the producer to create and edit the shot of a live broadcast without interrupting or halting the broadcast. The producer may control both viewable broadcast media and hidden broadcast media, for example producer client 108 may control the camera(s), layout/composition of cameras, a teleprompter, text-based communications (e.g., chat), control of visible labels (e.g., virtual nameplates), etc. The producer may save a shot to host device 102 for later retrieval. For example, the producer may save a specific arrangement of RTC feeds and other media to host device 102, such that the specific arrangement may be easily accessible and recreated at another time. For example, a saved shot may comprise a predetermined video layout, presenter count and camera arrangement, graphical displays (e.g., splash screens), etc. Saving a shot facilitates a quick deployment of a reoccurring broadcast without needing to rebuild the specific arrangement.

The producer client enables the producer to save a sequence of shots in a predetermined order (AKA a run-of-show or showboard), such that a multi-part broadcast may be controlled by transitioning between a plurality of saved shots. The run of show may include any sequence of pre-filmed and/or live broadcast segments. Producer client 108 enables the producer to specify when each transition between shots in the run of show occurs, such that the run of show is semi-automatic. For example, the producer may specify a pre-determined length of time for each shot and/or manually transition through the sequence. In some examples, the run of show is configured such that each shot automatically begins when the preceding shot ends, such that the run of show is entirely automated.

A frame-capturing module 120 is hosted on host device(s) 102 and configured to capture each frame of the composed shot and render the captured frames into the broadcasted video output. The frame-capturing module 120 may capture the frames of the composed shot at a fixed sample rate, e.g., 60 frames-per-second (FPS). In some examples frame-capturing module 120 comprises portions of a web browser without a graphical user interface (i.e., a headless browser). In other words, in some examples the capturing and rendering of the broadcast media by module 120 includes capturing each frame of the video output in a headless browser and assembling the frames into a video stream for communication with the viewer client 112.

While a current shot is being captured by module 120 and broadcast to viewers, broadcast system 100 may preload the next (i.e., subsequent) shot to reduce the amount of instantaneous computation required at the transition from one shot to the next (see FIG. 9 and associated description below). In some examples, broadcast system 100 may preload the next shot, including encoding the output video for the next shot, and place it behind the current shot in the broadcast video (e.g., in a posterior position), such that it is not visible but fully loaded. In other words, the current shot is in front of the next shot (i.e., placed forward in a visible position). When the producer transitions to the next shot, the current shot is removed and the next shot (now the new current shot) is fully loaded and begins broadcasting, i.e., without the need to load upon transition. This configuration enables higher video synchronicity between client devices and decrease the likelihood of discontinuities in the video broadcast during transitions between shots.

Figure 2:
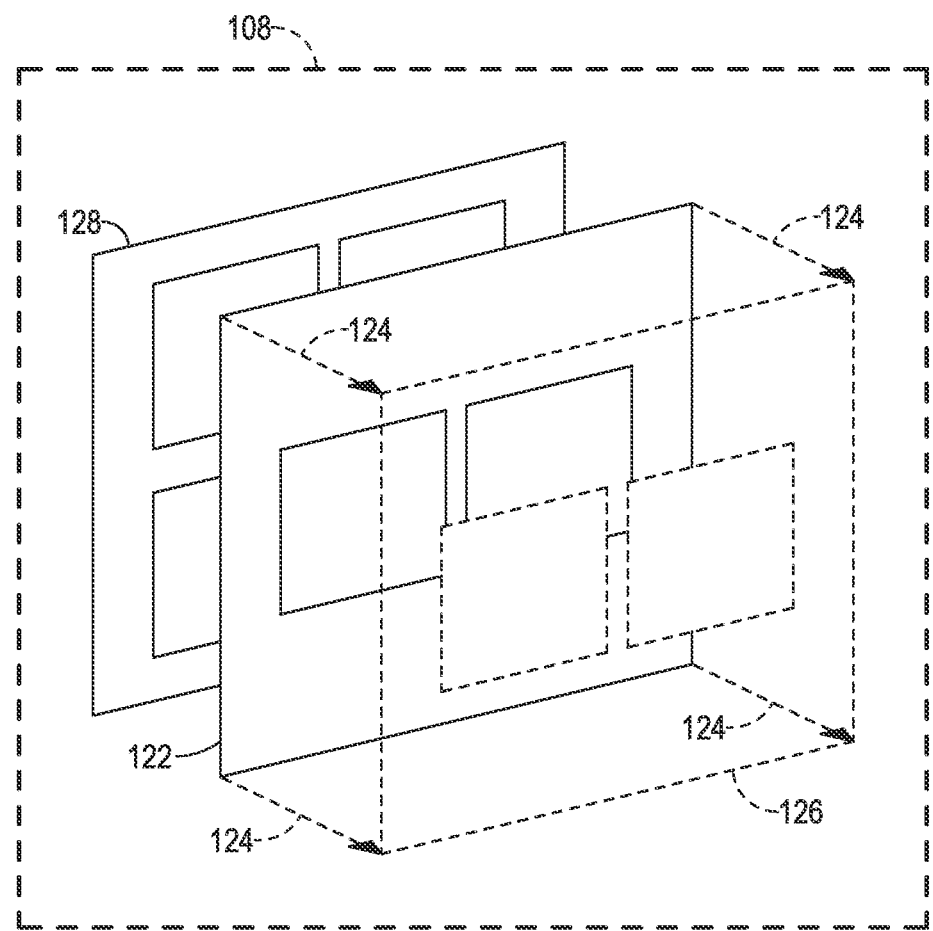
FIG. 2 is a schematic diagram of a video broadcast rendering process of the cloud-based video broadcast system of FIG. 1.

An example of the loading and capturing of the shots is shown in FIG. 2. As depicted, a current shot 122 is shown having two media portions. Module 120 is configured to capture each frame of shot 122, this capture process is shown in FIG. 2 as arrows 124. The capturing 124 of shot 122 results in live broadcast 126 configured to be transmitted to viewer client 112. While shot 122 is being captured and transmitted, the next shot 128 is preloaded behind shot 122, shown in this example as having four media portions. As the next shot 128 is placed behind the current shot 122, it is not visible to module 120 and thus is not captured by process 124 and therefore not included in broadcast 126. When the producer cues the transition to the next shot, the current shot is simply closed and module 120 begins capturing the frames of the shot 128. If the run-of-show includes another subsequent shot, the next subsequent shot would then be loaded behind the now current shot and the process would be repeated.

Figure 3:
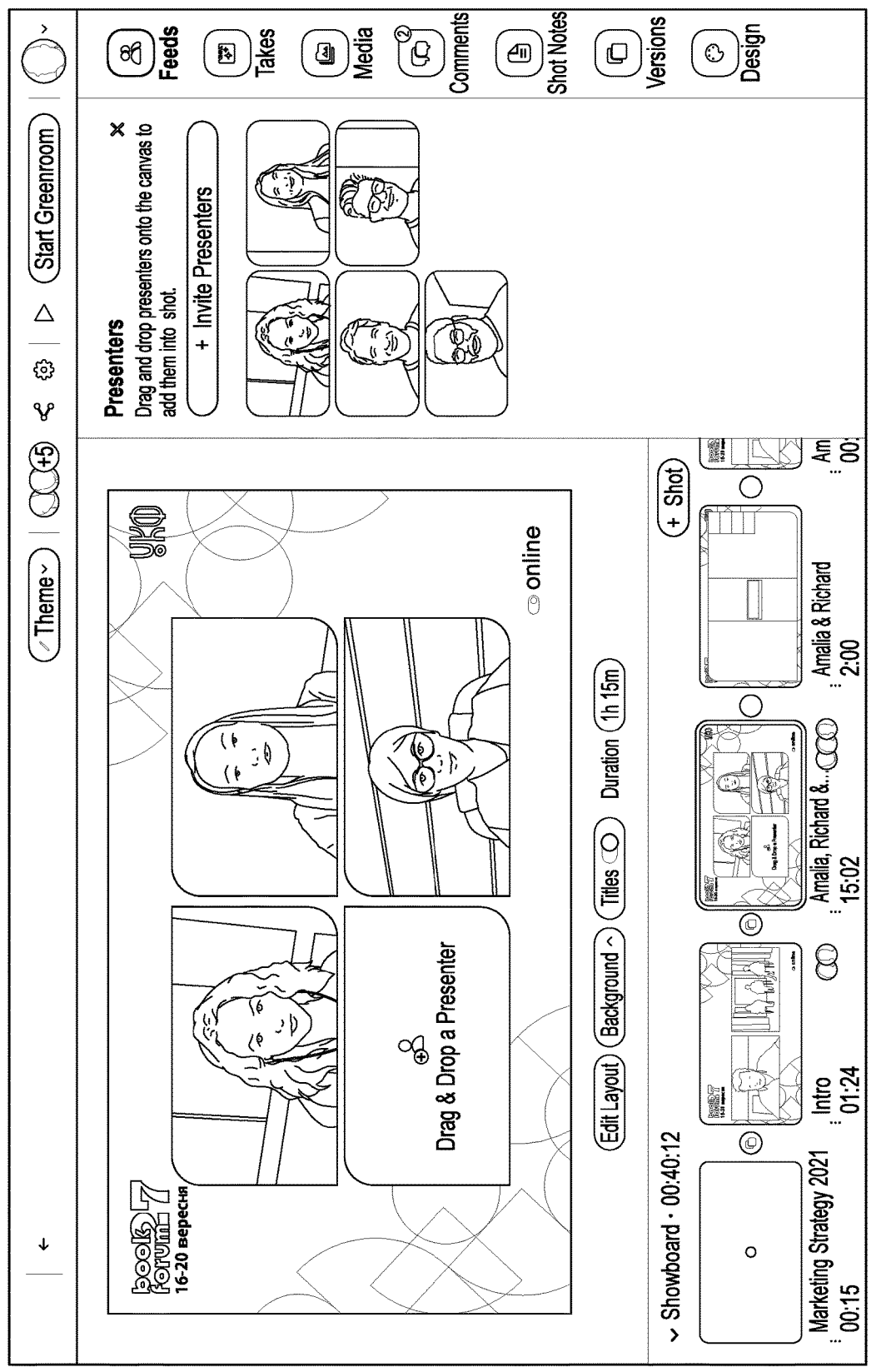
FIG. 3 is a graphical user interface depicting aspects of the cloud-based video broadcast system of FIG. 1.

A graphical user interface of the producer client depicting a finished showboard is shown in FIG. 3. As shown in the lower portion of FIG. 3, the order of showboard 150 is depicted, with the currently live shot 152 selected. Shot 152 is displayed in a production area 151 (AKA a "canvas" area), for editing and shot composition by the producer. As shown at 151, the current shot comprises four symmetric quadrants, of which three include video feeds from presenters. The fourth, currently unassigned, quadrant includes the option to "drag & drop" a fourth presenter from the list of presenters provided on the right-hand side. Additionally, or alternatively, media such as an image, a pre-recorded video, etc., may be placed in the currently unassigned quadrant. Furthermore, the layout, number of media spots (e.g., number of current presenters, etc.), and other aspects of the current shot may be changed by the producer, see FIGS. 4, 5 and associated description below.

Figure 4:
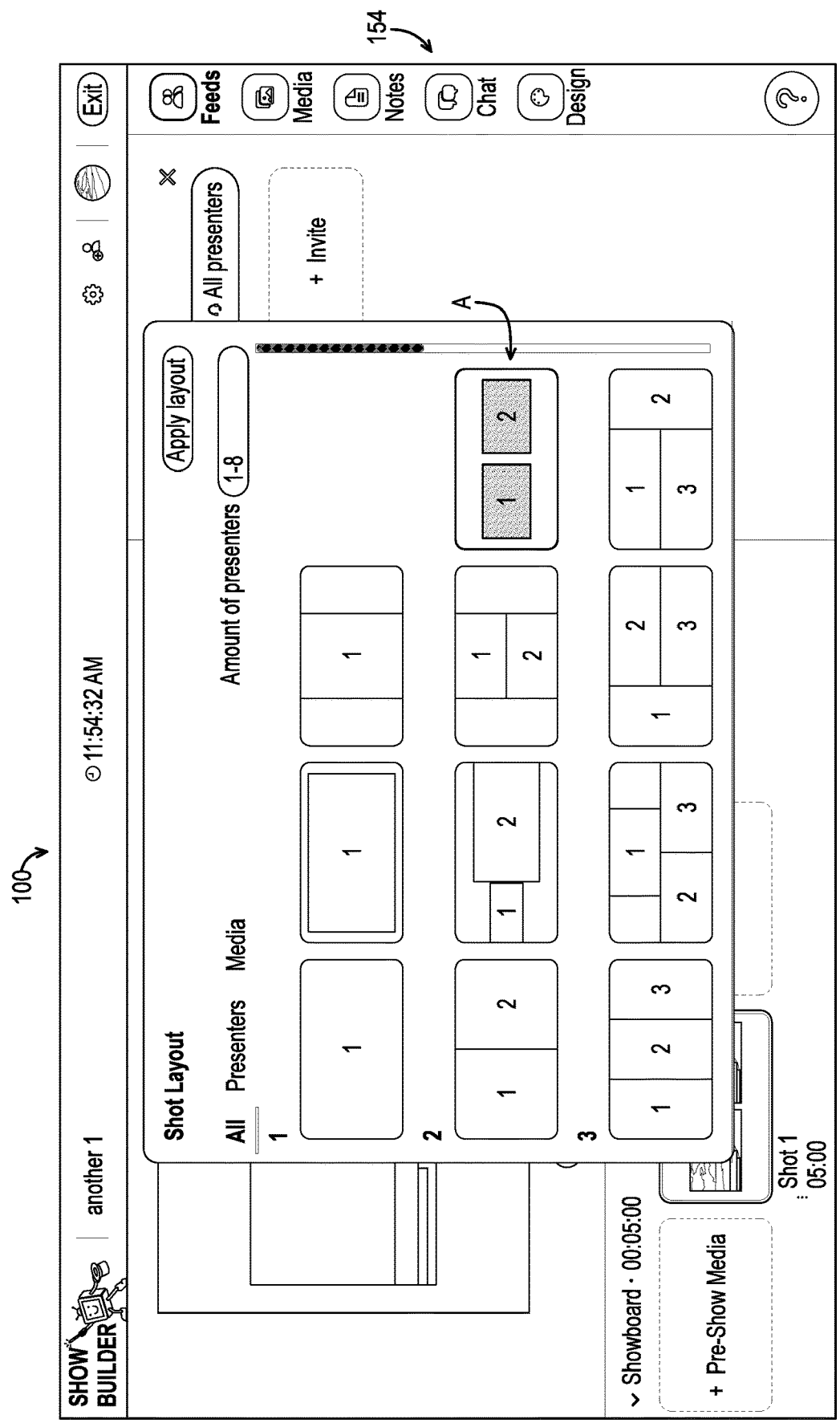
FIG. 4 is a graphical user interface depicting aspects of the cloud-based video broadcast system of FIG. 1.
Figure 5:
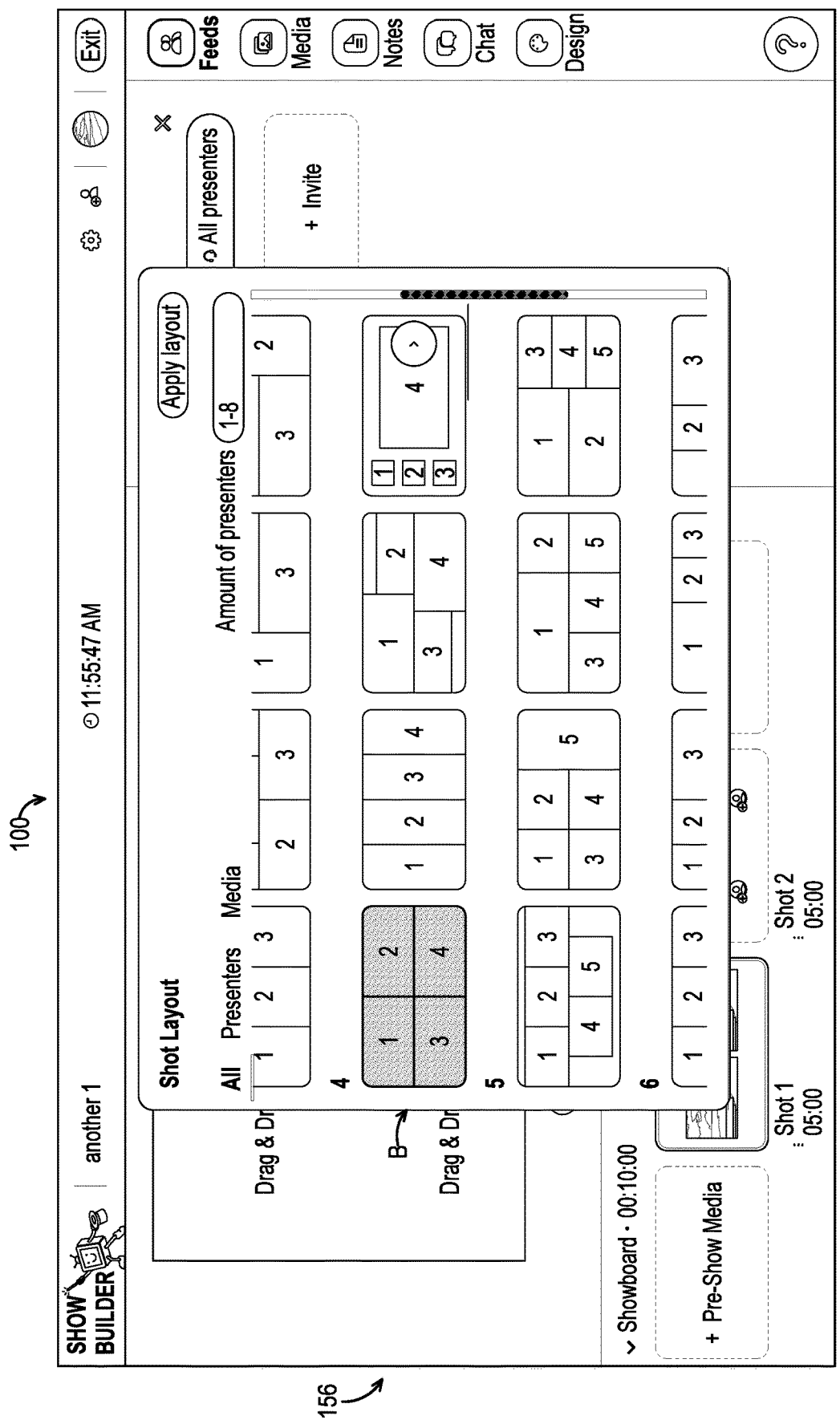
FIG. 5 is a graphical user interface depicting aspects of the cloud-based video broadcast system of FIG. 1.

The creation of a new showboard 160 utilizing producer client 108 is depicted in FIGS. 4-8. As depicted in FIG. 4, a layout A for a first shot 154 is selected having two symmetric media portions. As shown in FIG. 4 and elsewhere, a number of unique shot compositions are available for the producer to select for each respective shot, a selection of which are shown. In some examples, the producer may provide (e.g., construct, upload, etc.,) their own shot composition for a given shot. As shown in FIG. 5, another layout B is selected for a second shot 156, in this example having four symmetric media portions.

Figure 6:
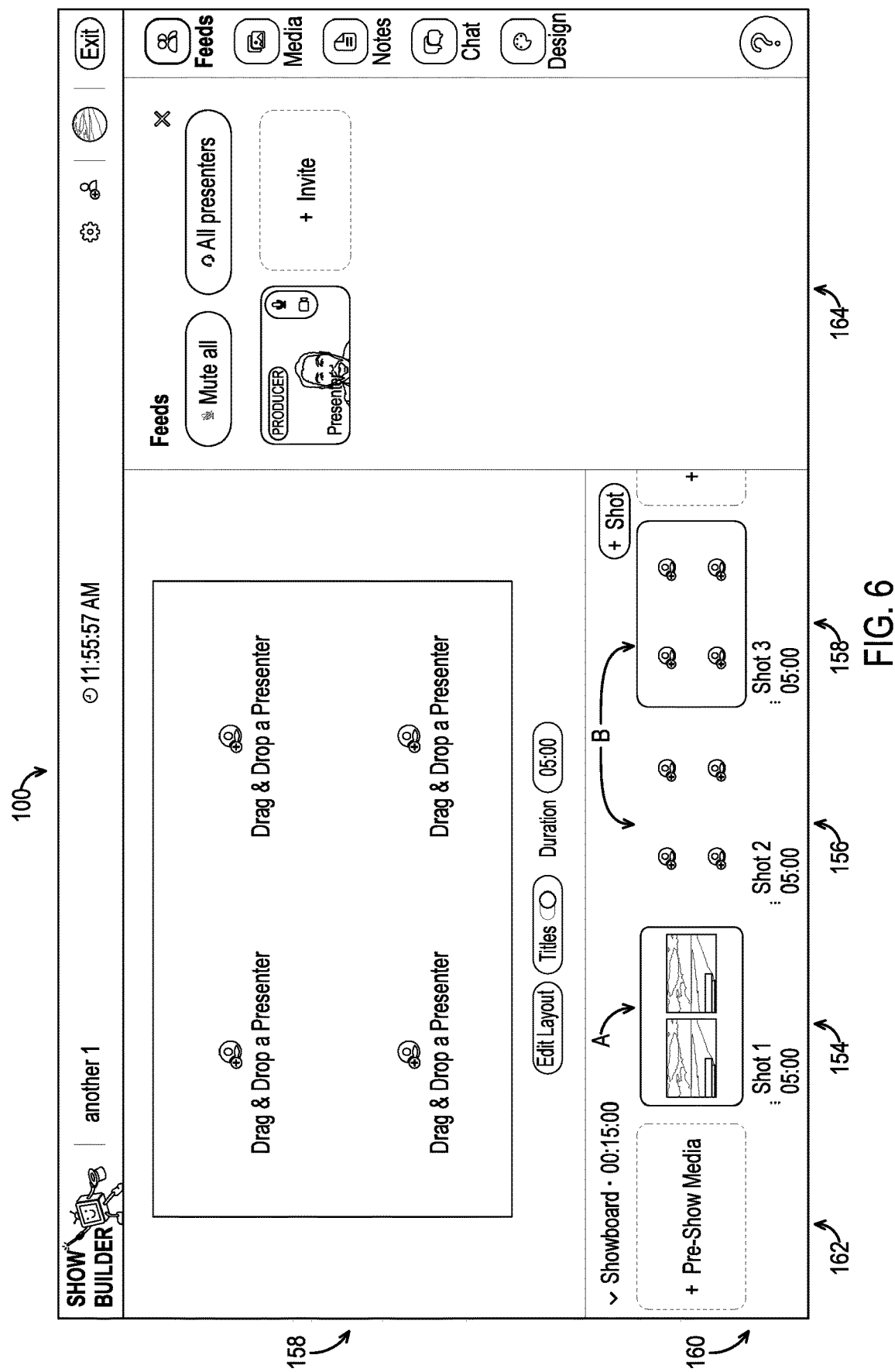
FIG. 6 is a graphical user interface depicting aspects of the cloud-based video broadcast system of FIG. 1.
Figure 7:
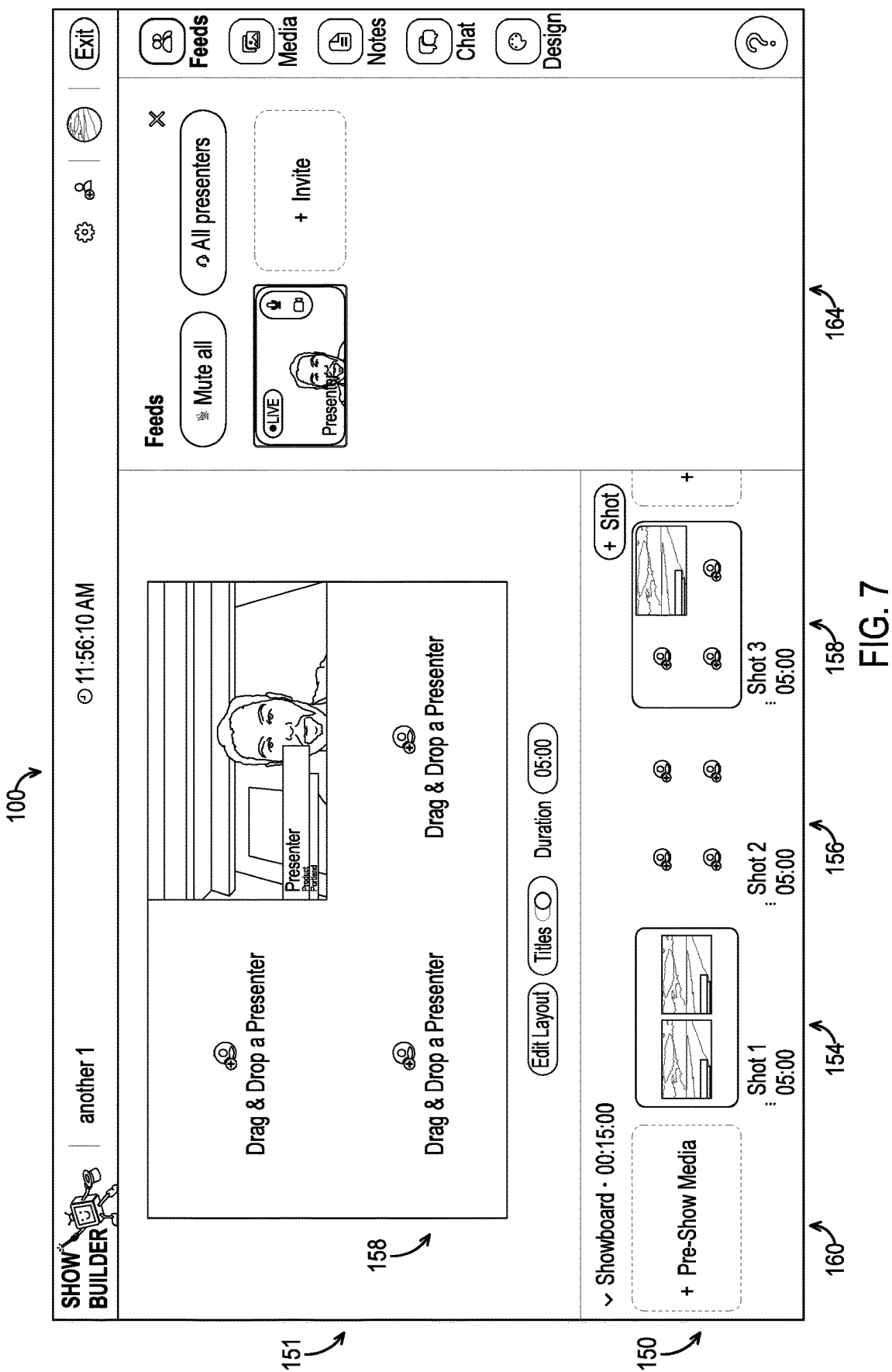
FIG. 7 is a graphical user interface depicting aspects of the cloud-based video broadcast system of FIG. 1.

As shown in FIG. 6, the producer has created three shots for showboard 160, namely first shot 154, second shot 156, and third shot 158, each of which have a selected media layout for adding media, presenter video feed(s), etc, namely layouts A and B. Furthermore, a pre-show portion 162 of showboard 160 is reserved for adding pre-show media. For example, the producer may add a splash screen, a countdown timer, an introductory video, etc., to be shown before the live broadcast begins. Furthermore, as shown in FIG. 7, third shot 158 is selected for editing and therefore occupies production area 151. Accordingly, the producer may make edits to the shot composition of third shot 158, by manipulating media (e.g., dragging and dropping media files) in the production area 151.

Figure 8:
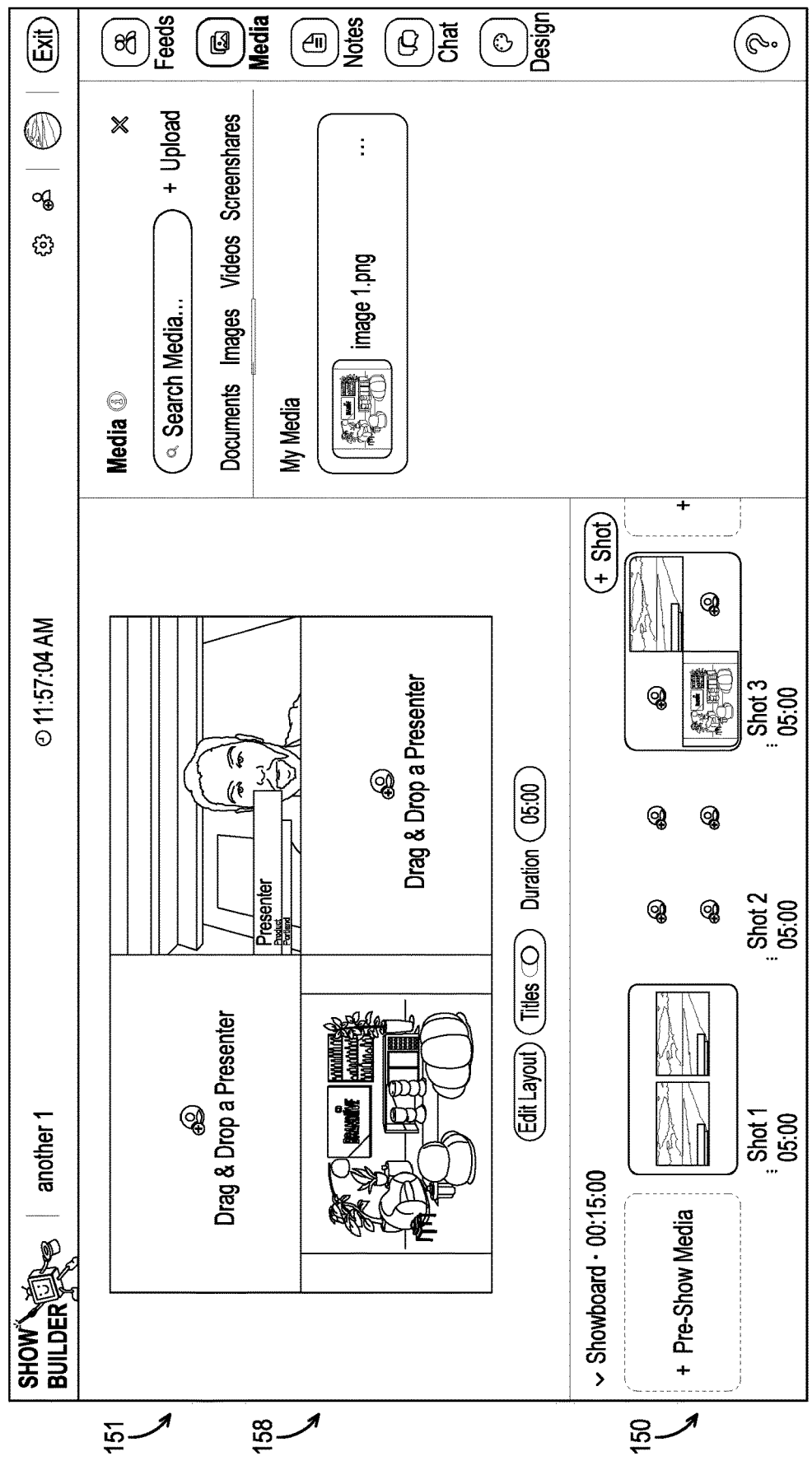
FIG. 8 is a graphical user interface depicting aspects of the cloud-based video broadcast system of FIG. 1.

As shown at 164, a list of active presenters 164 is available for the producer to add to a respective shot. In some examples, list of active presenters 164 may depict only the presenters currently sending video from their respective presenter client. As shown in FIG. 7, the producer may add one or more of the presenters from list 164 to the current shot in production area 151 (i.e., third shot 158). In the example depicted in FIG. 7, the presenter in list 164 has been added to the upper right quadrant of third shot 158 in production area 151. Turning now to FIG. 8, the producer has added a media item (in this example a still image), to the lower left quadrant of third shot 158. The producer may edit any of the existing shots and/or create new shots, remove shots, etc., in this manner until the showboard (i.e., run-of-show), is complete.

In some examples, the producer may add or subtract video and/or audio feeds of any number of presenters during a broadcast. For example, if a new presenter becomes available for the broadcast, the new presenter client 110 may request admission to the broadcast and the producer may merge the broadcast media from the new presenter to the current shot. Additionally, or alternatively, the producer may save media to storage on host device 102 for later retrieval, e.g., during a broadcast. This is especially helpful if bandwidth or upload/download speed is an issue for presenter client 110. For example, the producer may save a number of pre-recorded segments on host device 102 and compose shots from these segments during the live broadcast. Broadcast system 100 enables the producer to organize a broadcast from any combination of live video feeds, live audio feeds, pre-recorded video feeds, and/or pre-recorded audio feeds in any order.

The producer client enables the creation of non-broadcast audio channels (AKA "backstage chat"), to communicate with the presenter and/or other producers. The backstage chat may comprise a one-way communication channel, reserved for the producer to speak solely to the presenter, or a two-way communication channel, in which the presenter is able to response privately to the producer. Additionally, or alternatively, the backstage chat may be utilized between two producers communicating between separate instances of the producer client. In some examples, the backstage chat may be utilized via a "push-to-talk" (AKA momentary transmission) interface. The backstage chat may include volume control for each person (i.e., presenter(s), producer(s), etc.) utilizing the chat. For example, a personal slider, dial, or other volume control may be utilized by each respective user for each other respective user. In some examples, the backstage chat may include a master volume control for controlling the overall volume of the backstage chat (e.g., with respect to the broadcast volume).

When the producer is ready to begin the broadcast, the producer client is utilized to make a request to host device 102 to open the RTC feeds and push the broadcast live to the RTMP destination (e.g., viewer client 112). In some examples, browser interface 106 enables the broadcast to be sent to several streaming platforms simultaneously, e.g., both viewers 112 and other, third-party, streaming platforms. Video broadcast system 100 is configured to natively integrate with other mass distribution platforms and unaffiliated third-party video destinations by enabling manual setup between the broadcast system and other streaming protocols.

Presenter client 110 is utilized by the presenters in the broadcast, i.e., those whose pictures, video, audio, and other media is provided for the output video. Presenter client 110 is configured to interface with electronic input devices of the presenter, such as a camera, microphone, etc. In some examples, presenter client 110 interfaces with a mobile device, such as a smart phone.

The presenter client requests secure access to host device 102, for example with a unique access code, e.g., provided by email, text, etc. After establishing security access, presenter client may retrieve presenter-specific data and functions such as the teleprompter, private videos, notes, and a private chat with producer client 108. Presenter client 110 may also access a public chat with viewer client 112.

The teleprompter may present the presenter with a script, speaking notes, and other textual and/or visual cues. The teleprompter may include media provided by the producer and/or one or more of the presenters. In some examples, the teleprompter is auto-scrolling based on a specified scroll-rate. In some examples, the teleprompter is auto-scrolling based on a real-time analysis of the speech cadence of the producer. For example, as the presenter speaks, broadcast system 100 may analyze the speaking rate and/or articulation rate of the presenter and automatically provide teleprompter cues accordingly. In some examples, the teleprompter is manually managed, e.g., by a producer.

The presenter may utilize presenter client 110 to import media and RTC feeds such as video, audio, images, slides, etc. to host device 102 before a broadcast has gone live for the producer to use in composing shots. This enables more media content to be available for the producer, while minimizing the bandwidth strain on the presenter while broadcasting. Presenter client 110 may also accept multiple cameras from the presenter's electronic devices and simultaneously send all of the video feeds to host device 102, such that the producer may freely switch between them during the broadcast. For example, presenter client 110 enables the presenter to add a plurality of video feeds to be used for composition by the producer, such as professional television camera, a webcam, a cell phone camera, etc. Additionally, or alternatively, the presenter may switch between different cameras while in a live broadcast.

Viewer client 112 is utilized by the viewers to decode the RTC feeds from browser interface 106 and provide the final video and audio output of the broadcast to the viewer's digital device. In some examples, viewer client 112 is entirely passive in the broadcast, relegated solely to viewing the broadcast. In other examples, viewer client 112 enables viewers to interact with the presenter(s), e.g., with a public and/or private chat. Viewer client 112 may access public broadcasts with a direct browser link and/or private broadcasts with a secure access code, registration, or other security feature.

An example of video capturing and broadcast creation performed by broadcast system 100 on host device 102 is described below with reference to FIG. 9. Where appropriate, reference may be made to components and systems described above that may used in carrying out each step. These references are for illustration, and are not intended to limit the possible ways of carrying out any particular step of the method.

Figure 9:
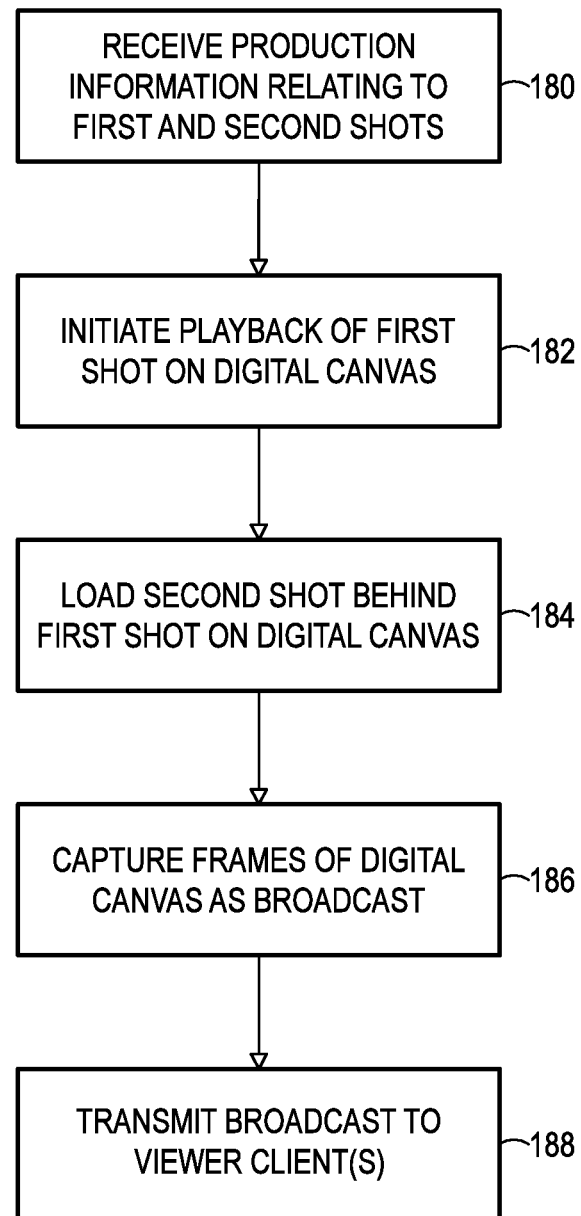
FIG. 9 is a flowchart depicting steps of a method of video broadcasting in accordance with the present teachings.

FIG. 9 is a flowchart illustrating steps performed in an illustrative method, and may not recite the complete process or all steps of the method. Although the steps of the method are described below and depicted in a linear order, the steps need not necessarily all be performed, and in some cases may be performed simultaneously or in a different order than the order shown.

At step 180 production information relating to a first and second shot is received by host device 102 from one or more production client(s) 108. The production information includes any shot composition constraints decided by the producer, such as number of presenters, layout of media elements, pre-recorded media, etc. In this example, two shots are described, though any number of shots may be provided to host device 102 (e.g., at the producer(s) discretion or as required by a specific run-of-show).

At step 182, playback of the first shot is initiated. In this example, playback may refer to the activation of a live video stream, the initiation of pre-recorded media (e.g., video, audio, etc.), or other action resulting in the initiation of any media contained within the first shot.

At step 184 the second shot is loaded behind the first shot (e.g., in a posterior position), such that the second shot is hidden behind the first shot. In this manner, the second shot is fully loaded and rendered behind the first shot to remove any loading time when transitioning between the first and second shots.

At step 186 the frames (e.g., video frames) of the first shot are captured by frame-capturing module 120 to form the broadcast as described above.

At step 188, the broadcast is transmitted to viewer client(s) 112 as described above.

To transition to the second shot, the first shot is removed from the digital canvas thereby leaving the second shot visible. Playback and capturing of the second shot may then be initiated in a manner substantially similar to the first shot. In examples including three or more shots, each subsequent shot is preloaded behind the current shot and transitioned in a similar manner.

B. Illustrative Data Processing System

Figure 10:
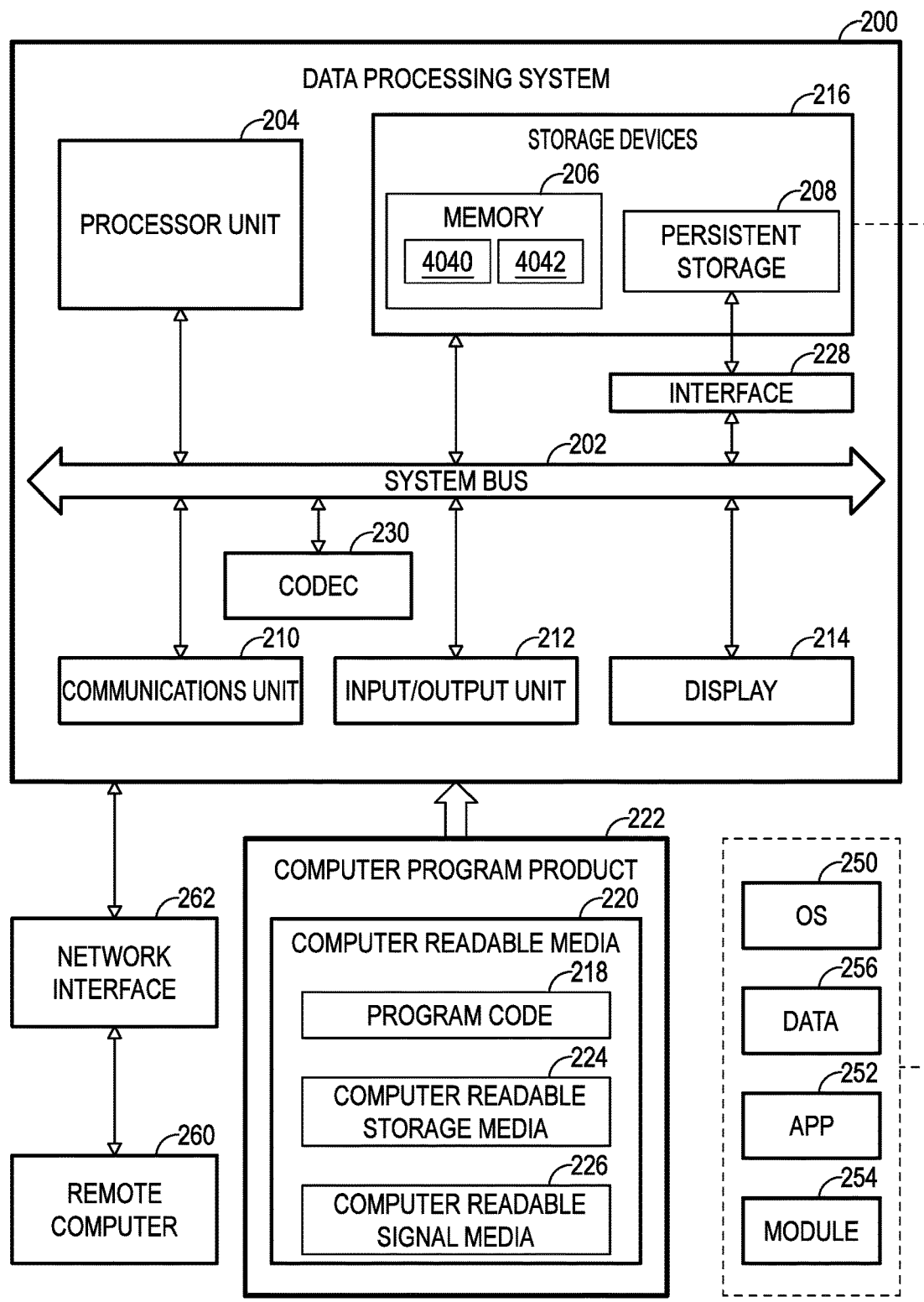
FIG. 10 is a schematic diagram of an illustrative data processing system in accordance with the present teachings.

As shown in FIG. 10, this example describes a data processing system 200 (also referred to as a computer, computing system, and/or computer system) in accordance with aspects of the present disclosure. In this example, data processing system 200 is an illustrative data processing system suitable for implementing aspects of the cloud-based video broadcast system. More specifically, in some examples, devices that are embodiments of data processing systems (e.g., smartphones, tablets, personal computers) may be included in the host device and/or client devices described above.

In this illustrative example, data processing system 200 includes a system bus 202 (also referred to as communications framework). System bus 202 may provide communications between a processor unit 204 (also referred to as a processor or processors), a memory 206, a persistent storage 208, a communications unit 210, an input/output (I/O) unit 212, a codec 230, and/or a display 214. Memory 206, persistent storage 208, communications unit 210, input/output (I/O) unit 212, display 214, and codec 230 are examples of resources that may be accessible by processor unit 204 via system bus 202.

Processor unit 204 serves to run instructions that may be loaded into memory 206. Processor unit 204 may comprise a number of processors, a multi-processor core, and/or a particular type of processor or processors (e.g., a central processing unit (CPU), graphics processing unit (GPU), etc.), depending on the particular implementation. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device may include any suitable hardware capable of storing information (e.g., digital information), such as data, program code in functional form, and/or other suitable information, either on a temporary basis or a permanent basis.

Storage devices 216 also may be referred to as computer-readable storage devices or computer-readable media. Memory 206 may include a volatile storage memory 240 and a non-volatile memory 242. In some examples, a basic input/output system (BIOS), containing the basic routines to transfer information between elements within the data processing system 200, such as during start-up, may be stored in non-volatile memory 242. Persistent storage 208 may take various forms, depending on the particular implementation.

Persistent storage 208 may contain one or more components or devices. For example, persistent storage 208 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 208 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 208 to system bus 202, a removable or non-removable interface is typically used, such as interface 228.

Input/output (I/O) unit 212 allows for input and output of data with other devices that may be connected to data processing system 200 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 204 through system bus 202 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 200 and to output information from data processing system 200 to an output device. One or more output adapters may be provided for certain output devices (e.g., monitors, speakers, and printers, among others) which require special adapters. Suitable output adapters may include, e.g. video and sound cards that provide a means of connection between the output device and system bus 202. Other devices and/or systems of devices may provide both input and output capabilities, such as remote computer(s) 260. Display 214 may include any suitable human-machine interface or other mechanism configured to display information to a user, e.g., a CRT, LED, or LCD monitor or screen, etc.

Communications unit 210 refers to any suitable hardware and/or software employed to provide for communications with other data processing systems or devices. While communication unit 210 is shown inside data processing system 200, it may in some examples be at least partially external to data processing system 200. Communications unit 210 may include internal and external technologies, e.g., modems (including regular telephone grade modems, cable modems, and DSL modems), ISDN adapters, and/or wired and wireless Ethernet cards, hubs, routers, etc. Data processing system 200 may operate in a networked environment, using logical connections to one or more remote computers 260. A remote computer(s) 260 may include a personal computer (PC), a server, a router, a network PC, a workstation, a microprocessor-based appliance, a peer device, a smart phone, a tablet, another network note, and/or the like. Remote computer(s) 260 typically include many of the elements described relative to data processing system 200. Remote computer(s) 260 may be logically connected to data processing system 200 through a network interface 262 which is connected to data processing system 200 via communications unit 210. Network interface 262 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 230 may include an encoder, a decoder, or both, comprising hardware, software, or a combination of hardware and software. Codec 230 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 230 is depicted as a separate component, codec 230 may be contained or implemented in memory, e.g., non-volatile memory 242.

Non-volatile memory 242 may include read only memory (ROM), programmable ROM (PROM), electrically programmable ROM (EPROM), electrically erasable programmable ROM (EEPROM), flash memory, and/or the like, or any combination of these. Volatile memory 240 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 216, which are in communication with processor unit 204 through system bus 202. In these illustrative examples, the instructions are in a functional form in persistent storage 208. These instructions may be loaded into memory 206 for execution by processor unit 204. Processes of one or more embodiments of the present disclosure may be performed by processor unit 204 using computer-implemented instructions, which may be located in a memory, such as memory 206.

These instructions are referred to as program instructions, program code, computer usable program code, or computer-readable program code executed by a processor in processor unit 204. The program code in the different embodiments may be embodied on different physical or computer-readable storage media, such as memory 206 or persistent storage 208. Program code 218 may be located in a functional form on computer-readable media 220 that is selectively removable and may be loaded onto or transferred to data processing system 200 for execution by processor unit 204. Program code 218 and computer-readable media 220 form computer program product 222 in these examples. In one example, computer-readable media 220 may comprise computer-readable storage media 224 or computer-readable signal media 226.

Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200.

In these examples, computer-readable storage media 224 is a non-transitory, physical or tangible storage device used to store program code 218 rather than a medium that propagates or transmits program code 218. Computer-readable storage media 224 is also referred to as a computer-readable tangible storage device or a computer-readable physical storage device. In other words, computer-readable storage media 224 is media that can be touched by a person.

Alternatively, program code 218 may be transferred to data processing system 200, e.g., remotely over a network, using computer-readable signal media 226. Computer-readable signal media 226 may be, for example, a propagated data signal containing program code 218. For example, computer-readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer-readable signal media 226 for use within data processing system 200. For instance, program code stored in a computer-readable storage medium in a server data processing system may be downloaded over a network from the server to data processing system 200. The computer providing program code 218 may be a server computer, a client computer, or some other device capable of storing and transmitting program code 218.

In some examples, program code 218 may comprise an operating system (OS) 250. Operating system 250, which may be stored on persistent storage 208, controls and allocates resources of data processing system 200. One or more applications 252 take advantage of the operating system's management of resources via program modules 254, and program data 256 stored on storage devices 216. OS 250 may include any suitable software system configured to manage and expose hardware resources of computer 200 for sharing and use by applications 252. In some examples, OS 250 provides application programming interfaces (APIs) that facilitate connection of different type of hardware and/or provide applications 252 access to hardware and OS services. In some examples, certain applications 252 may provide further services for use by other applications 252, e.g., as is the case with so-called "middleware." Aspects of present disclosure may be implemented with respect to various operating systems or combinations of operating systems.

The different components illustrated for data processing system 200 are not meant to provide architectural limitations to the manner in which different embodiments may be implemented. One or more embodiments of the present disclosure may be implemented in a data processing system that includes fewer components or includes components in addition to and/or in place of those illustrated for computer 200. Other components shown in FIG. 10 can be varied from the examples depicted. Different embodiments may be implemented using any hardware device or system capable of running program code. As one example, data processing system 200 may include organic components integrated with inorganic components and/or may be comprised entirely of organic components (excluding a human being). For example, a storage device may be comprised of an organic semiconductor.

In some examples, processor unit 204 may take the form of a hardware unit having hardware circuits that are specifically manufactured or configured for a particular use, or to produce a particular outcome or progress. This type of hardware may perform operations without needing program code 218 to be loaded into a memory from a storage device to be configured to perform the operations. For example, processor unit 204 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 218) may be implemented as hardware, e.g., by specifying an FPGA configuration using a hardware description language (HDL) and then using a resulting binary file to (re)configure the FPGA.

In another example, data processing system 200 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, system bus 202 may comprise one or more buses, such as a system bus or an input/output bus. Of course, the bus system may be implemented using any suitable type of architecture that provides for a transfer of data between different components or devices attached to the bus system. System bus 202 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 210 may include a number of devices that transmit data, receive data, or both transmit and receive data. Communications unit 210 may be, for example, a modem or a network adapter, two network adapters, or some combination thereof. Further, a memory may be, for example, memory 206, or a cache, such as that found in an interface and memory controller hub that may be present in system bus 202.

C. Illustrative Distributed Data Processing System

Figure 11:
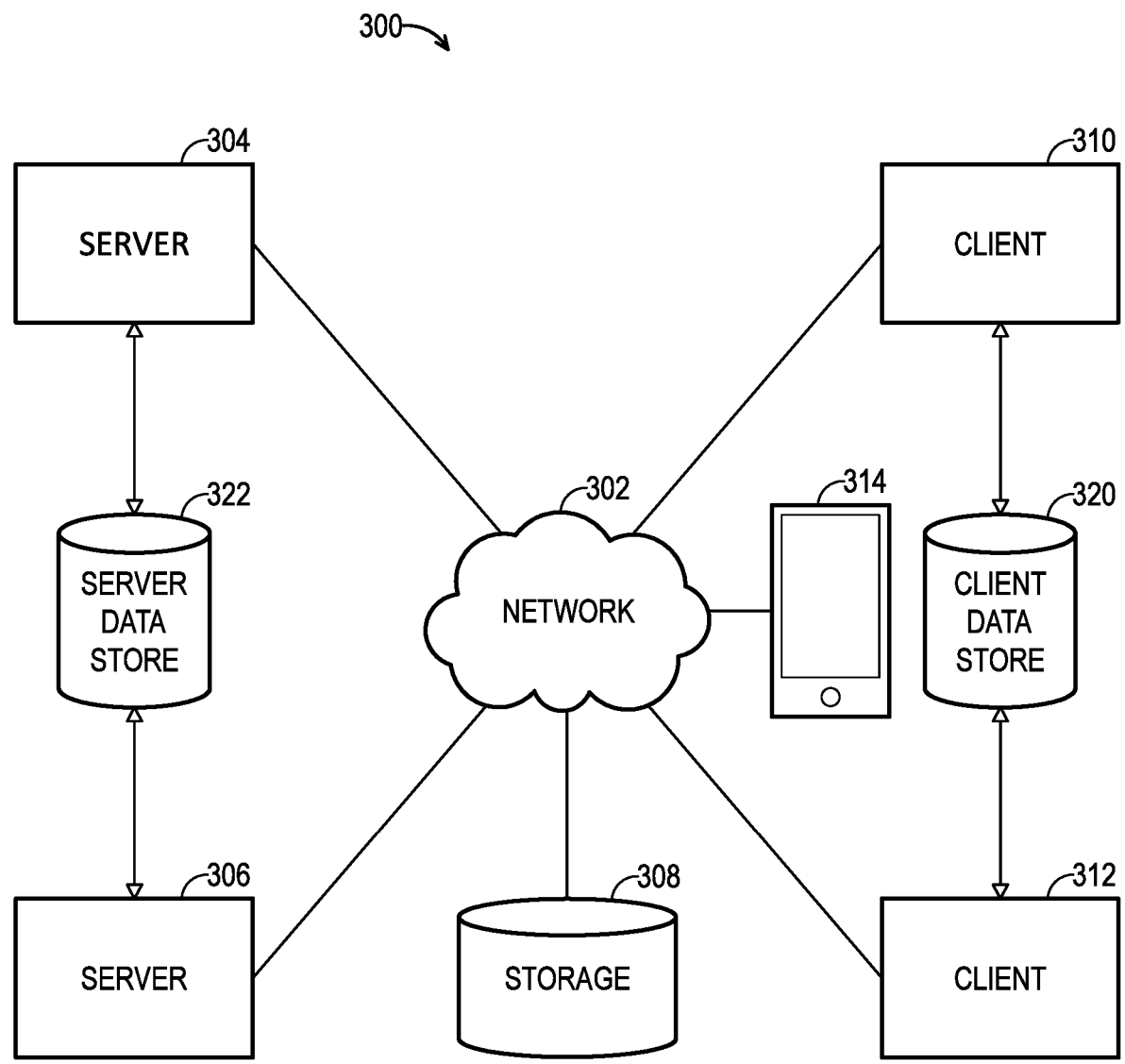
FIG. 11 is a schematic diagram of an illustrative network data processing system in accordance with the present teachings.

As shown in FIG. 11, this example describes a general network data processing system 300, interchangeably termed a computer network, a network system, a distributed data processing system, or a distributed network, aspects of which may be included in one or more illustrative embodiments of the cloud-based video broadcast system. For example, communication between the host device and client devices via the browser interface, described above, utilizes network communication.

It should be appreciated that FIG. 11 is provided as an illustration of one implementation and is not intended to imply any limitation with regard to environments in which different embodiments may be implemented. Many modifications to the depicted environment may be made.

Network system 300 is a network of devices (e.g., computers), each of which may be an example of data processing system 200, and other components. Network data processing system 300 may include network 302, which is a medium configured to provide communications links between various devices and computers connected within network data processing system 300. Network 302 may include connections such as wired or wireless communication links, fiber optic cables, and/or any other suitable medium for transmitting and/or communicating data between network devices, or any combination thereof.

In the depicted example, a first network device 304 and a second network device 306 connect to network 302, as do one or more computer-readable memories or storage devices 308. Network devices 304 and 306 are each examples of data processing system 200, described above. In the depicted example, devices 304 and 306 are shown as server computers, which are in communication with one or more server data store(s) 322 that may be employed to store information local to server computers 304 and 306, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 310 and 312 and/or a client smart device 314, may connect to network 302. Each of these devices is an example of data processing system 200, described above regarding FIG. 10. Client electronic devices 310, 312, and 314 may include, for example, one or more personal computers, network computers, and/or mobile computing devices such as personal digital assistants (PDAs), smart phones, handheld gaming devices, wearable devices, and/or tablet computers, and the like. In the depicted example, server 304 provides information, such as boot files, operating system images, and applications to one or more of client electronic devices 310, 312, and 314. Client electronic devices 310, 312, and 314 may be referred to as "clients" in the context of their relationship to a server such as server computer 304. Client devices may be in communication with one or more client data store(s) 320, which may be employed to store information local to the clients (e.g., cookie(s) and/or associated contextual information). Network data processing system 300 may include more or fewer servers and/or clients (or no servers or clients), as well as other devices not shown.

In some examples, first client electric device 310 may transfer an encoded file to server 304. Server 304 can store the file, decode the file, and/or transmit the file to second client electric device 312. In some examples, first client electric device 310 may transfer an uncompressed file to server 304 and server 304 may compress the file. In some examples, server 304 may encode text, audio, and/or video information, and transmit the information via network 302 to one or more clients.

Client smart device 314 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 300 may be stored in or on a computer-readable storage medium, such as network-connected storage device 308 and/or a persistent storage 208 of one of the network computers, as described above, and may be downloaded to a data processing system or other device for use. For example, program code may be stored on a computer-readable storage medium on server computer 304 and downloaded to client 310 over network 302, for use on client 310. In some examples, client data store 320 and server data store 322 reside on one or more storage devices 308 and/or 208.

Network data processing system 300 may be implemented as one or more of different types of networks. For example, system 300 may include an intranet, a local area network (LAN), a wide area network (WAN), or a personal area network (PAN). In some examples, network data processing system 300 includes the Internet, with network 302 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 302 may be referred to as a "cloud." In those examples, each server 304 may be referred to as a cloud computing node, and client electronic devices may be referred to as cloud consumers, or the like. FIG. 11 is intended as an example, and not as an architectural limitation for any illustrative embodiments.

D. Illustrative Combinations and Additional Examples

This section describes additional aspects and features of cloud-based video broadcast systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A computer implemented method for video broadcasting, the method comprising:

receiving, via a graphical user interface (GUI), first information relating to a first shot including one or more first digital media resources and second information relating to a second shot including one or more second digital media resources;

playing a first video feed in accordance with the first information on a digital canvas;

loading a second video feed in accordance with the second information on the digital canvas, such that the second video feed is hidden by the first video feed;

generating a broadcast by capturing a series of video frames of the digital canvas; and transmitting the broadcast to one or more first remote devices.

A1. The computer implemented method of paragraph A0, wherein the one or more first digital media resources includes at least one first live video feed.

A2. The computer implemented method of paragraph A0 or A1, wherein the one or more second digital media resources includes at least one second live video feed.

A3. The computer implemented method of any one of paragraphs A0 through A2, wherein transmitting the broadcast to one or more remote devices includes utilizing a real-time communication protocol.

A4. The computer implemented method of any one of paragraphs A0 through A3, wherein capturing the video frames of the digital canvas includes utilizing a headless web browser to capture the video frames.

A5. The computer implemented method of any one of paragraphs A0 through A4, further comprising:
receiving, via the GUI, third information relating to a third shot including one or more third digital media resources;
removing the first video feed from the digital canvas;
playing the second video feed on the digital canvas; and
loading a third video feed in accordance with the third information on the digital canvas, such that the third video feed is hidden by the second video feed.

A6. The computer implemented method of paragraph A5, wherein the GUI is provided to one or more second remote devices.

A7. The computer implemented method of paragraph A6, wherein removing the first video feed is initiated by a first remote user via the GUI on the one or more second remote devices.

A8. The computer implemented method of paragraph A7, wherein at least one of the first, second, or third digital media resources includes a live video feed provided by a second remote user; and
wherein the first remote user is in network communication with the second remote user, such that the first remote user is able to communicate virtually with the second remote user.

B0. A data processing system for video processing, comprising:
one or more processors;
a memory; and
a plurality of instructions stored in the memory and executable by the one or more processors to:
receive, via a graphical user interface (GUI), first information relating to a first shot including one or more first digital media resources and second information relating to a second shot including one or more second digital media resources;
play a first video feed in accordance with the first information on a digital canvas;
load a second video feed in accordance with the second information on the digital canvas, such that the second video feed is hidden by the first video feed;
capture a series of video frames of the digital canvas to generate a broadcast; and
transmit the broadcast to one or more first remote devices.

B1. The data processing system of paragraph B0, wherein the one or more first digital media resources includes at least one first live video feed.

B2. The data processing system of any one of paragraphs B0 through B1, wherein the one or more second digital media resources includes at least one second live video feed.

B3. The data processing system of any one of paragraphs B0 through B2, wherein transmitting the broadcast to one or more remote devices includes utilizing a real-time communication protocol.

B4. The data processing system of any one of paragraphs B0 through B3, wherein capturing the video frames of the digital canvas includes utilizing a headless web browser to capture the video frames.

B5. The data processing system of any one of paragraphs B0 through B4, wherein the plurality of instructions are further executable by the one or more processors to:
receive, via the GUI, third information relating to a third shot including one or more third digital media resources;
remove the first video feed from the digital canvas;
play the second video feed on the digital canvas; and
load a third video feed in accordance with the third information on the digital canvas, such that the third video feed is hidden by the second video feed.

B6. The data processing system of paragraph B5, wherein the GUI is provided to one or more second remote devices.

B7. The data processing system of paragraph B6, wherein removing the first video feed is initiated by a first remote user via the GUI on the one or more second remote devices.

B8. The data processing system of paragraph B7, wherein at least one of the first, second, or third digital media resources includes a live video feed provided by a second remote user; and wherein the first remote user is in network communication with the second remote user, such that the first remote user is able to communicate virtually with the second remote user.

B9. The data processing system of paragraph B8, wherein the first remote user is able to communicate virtually with the second remote user through the use of an audio channel distinct from the broadcast.

B10. The data processing system of paragraph B7, wherein at least one of the first information, the second information, or the third information is provided by the first remote user via a first device of the second remote devices; and
wherein another of the first information, the second information, or the third information is provided by a second remote user via a second device of the second remote devices.

Advantages, Features, and Benefits

The different embodiments and examples of the video broadcast system described herein provide several advantages over known solutions for producing, presenting, and/or viewing video broadcasts. For example, illustrative embodiments and examples described herein allow for an entirely browser-based broadcast system that does not require any client-side executables.

Additionally, and among other benefits, illustrative embodiments and examples described herein allow virtual creation and rendering of a broadcast video from a remote device resulting in consistency and high-quality video regardless of the producer's hardware or bandwidth.

Additionally, and among other benefits, illustrative embodiments and examples described herein allow the production of pre-composed run-of-shows (AKA shot sequences) without the need for live segment switching.

Additionally, and among other benefits, illustrative embodiments and examples described herein allow the ability to merge live video and pre-recorded video into the same broadcast.

Additionally, and among other benefits, illustrative embodiments and examples described herein allow for presenters to join a live stream remotely without needing to download or run a dedicated software application besides a web browser.

Additionally, and among other benefits, illustrative embodiments and examples described herein allow for the consolidation of the production and streaming workflows into a single cloud-based tool.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A computer implemented method for video broadcasting, the method comprising:
   while displaying a first video on a digital canvas, initializing a second video on the digital canvas, such that the second video is obscured by the first video;
   generating a broadcast by capturing a series of video frames of the digital canvas such that the broadcast includes a display of the first video; and
   transmitting the broadcast to one or more first remote devices.

2. The computer implemented method of claim 1, further comprising:
   removing the first video from the digital canvas; and
   while playing the second video on the digital canvas, initializing a third video on the digital canvas, such that the third video is hidden by the second video.

3. The computer implemented method of claim 2, wherein removing the first video is initiated by a remote user via a second remote device.

4. The computer implemented method of claim 1, wherein transmitting the broadcast to one or more remote devices includes utilizing a real-time communication protocol.

5. The computer implemented method of claim 1, wherein capturing the video frames of the digital canvas includes utilizing a headless web browser to capture the video frames.

6. The computer implemented method of claim 1, further comprising:
   receiving from a first user, via a first graphical user interface on a first device, first information relating to one or more first digital media resources;
   receiving from a second user, via a second graphical user interface on a second device, second information relating to one or more second digital media resources; and
   wherein displaying the first video on the digital canvas includes displaying the first video in accordance with the first and second information.

7. The computer implemented method of claim 6, wherein at least one of the first digital media resources and the second digital media resources include a live video feed.

8. The computer implemented method of claim 7, wherein the live video feed is provided by a third user via a remote device.

9. The computer implemented method of claim 6, wherein the first digital media resources include a first live video feed provided by a third user via a first remote device; and
   wherein the second digital media resources include a second live video feed provided by a fourth user via a second remote device.

10. A computer implemented method for video broadcasting, the method comprising:
    in response to displaying a first video on a digital canvas, initializing a second video on the digital canvas, such that the second video is obscured by the first video;
    generating a broadcast by capturing a series of video frames of the digital canvas such that the broadcast includes a display of the first video; and
    transmitting the broadcast to one or more first remote devices.

11. The computer implemented method of claim 10, further comprising:
    removing the first video from the digital canvas; and
    in response to playing the second video on the digital canvas, initializing a third video on the digital canvas, such that the third video is hidden by the second video.

12. The computer implemented method of claim 10, wherein transmitting the broadcast to one or more remote devices includes utilizing a real-time communication protocol.

13. The computer implemented method of claim 10, wherein capturing the video frames of the digital canvas includes utilizing a headless web browser to capture the video frames.

14. The computer implemented method of claim 10, further comprising:
    receiving from a first user via a first device, first information relating to one or more first digital media resources;
    receiving from a second user via a second device, second information relating to one or more second digital media resources; and
    wherein displaying the first video on a digital canvas includes displaying the first video in accordance with the first information and the second information.

15. The computer implemented method of claim 14, wherein at least one of the first digital media resources and the second digital media resources include at least one live video feed.

16. The computer implemented method of claim 15, wherein the at least one live video feed is provided by a third user via a third device.

17. The computer implemented method of claim 16, wherein the third user is in network communication with the first user, such that the third user is able to communicate virtually with the first user.

18. The computer implemented method of claim 17, wherein virtual communication between the third user and the first user is conducted using an audio channel distinct from the broadcast.

19. The computer implemented method of claim 14, wherein the first digital media resources include a first live video feed provided by a third user via a first remote device; and wherein the second digital media resources include a second live video feed provided by a fourth user via a second remote device.

20. The computer implemented method of claim 14, wherein the first user is in network communication with the second user, such that the first user is able to communicate virtually with the second user; and wherein virtual communication between the first user and the second user is conducted through the use of an audio channel distinct from the broadcast.

* * * * *